United States Patent
Takamiya et al.

(10) Patent No.: US 9,182,317 B2
(45) Date of Patent: Nov. 10, 2015

(54) SIMULATED GAS SUPPLY APPARATUS

(71) Applicant: BEST INSTRUMENTS CO., LTD., Kyoto (JP)

(72) Inventors: Akitoyo Takamiya, Kyoto (JP); Kotaro Takahashi, Kyoto (JP)

(73) Assignee: BEST INSTRUMENTS CO., LTD., Kyoto (JP)

( * ) Notice: Subject to any disclaimer, the term of this patent is extended or adjusted under 35 U.S.C. 154(b) by 119 days.

(21) Appl. No.: 14/152,783

(22) Filed: Jan. 10, 2014

(65) Prior Publication Data

US 2014/0123744 A1    May 8, 2014

Related U.S. Application Data

(63) Continuation of application No. PCT/JP2012/068215, filed on Jul. 18, 2012.

(30) Foreign Application Priority Data

Oct. 18, 2011 (JP) ................................ 2011-228767

(51) Int. Cl.
*G01M 15/10* (2006.01)
*F01N 3/08* (2006.01)
*F01N 11/00* (2006.01)

(52) U.S. Cl.
CPC ........... *G01M 15/102* (2013.01); *F01N 3/0814* (2013.01); *F01N 11/00* (2013.01); *G01M 15/10* (2013.01); *Y02T 10/47* (2013.01)

(58) Field of Classification Search
CPC ... G01M 15/102; G01M 15/10; F01N 3/0814; F01N 11/00

USPC ..................................................... 137/624.11
See application file for complete search history.

(56) References Cited

U.S. PATENT DOCUMENTS 5,650,565 A * 7/1997 Nagy et al. ...................... 73/199
2004/0260483 A1 * 12/2004 Kar et al. .......................... 702/45

(Continued)

FOREIGN PATENT DOCUMENTS

| EP | 1785715 A2 | 5/2007 |
| JP | 2000-240429 A | 9/2000 |
| JP | 2002-311013 A | 10/2002 |

(Continued)

OTHER PUBLICATIONS

International Preliminary Report on Patentability issued in corresponding International Patent Application No. PCT/JP2012/068215 dated Apr. 22, 2014 (4 pages).

(Continued)

*Primary Examiner* — Kevin Lee
(74) *Attorney, Agent, or Firm* — Osha Liang LLP

(57) ABSTRACT

A simulated gas supply apparatus includes a raw gas source group including a plurality of raw gas sources, a plurality of flow controller groups, each of which includes a plurality of flow controllers, a flow control system including the flow controller groups, a primary supply pipe for supplying a simulated gas to an evaluation device, a primary exhaust pipe for exhausting the simulated gas, a switching valve system including a plurality of switching valves so as to switch the simulated gas flow between the primary supply pipe and the primary exhaust pipe, and a controlling unit that controls the flow control system and the switching valve system.

7 Claims, 2 Drawing Sheets

(56) References Cited

U.S. PATENT DOCUMENTS

2007/0144245 A1 6/2007 Yamada et al.
2013/0118605 A1* 5/2013 Okada et al. .................. 137/334

FOREIGN PATENT DOCUMENTS

| JP | 2007-155712 A | 6/2007 |
| JP | 4194581 B2 | 12/2008 |
| JP | 2010-013989 A | 1/2010 |
| JP | 2010-223877 A | 10/2010 |

OTHER PUBLICATIONS

Written Opinion of the International Searching Authority issued in corresponding International Patent Application No. PCT/JP2012/068215 dated Aug. 14, 2012 (3 pages).
International Search Report issued in corresponding International Application No. PCT/JP2012/068215 dated Aug. 6, 2012 (2 pages).
Espacenet Publication Abstract for JP2000-240429, publication date Sep. 5, 2000 (2 pages).
Espacenet Publication Abstract for JP4194581, publication date Dec. 10, 2008 (2 pages).

* cited by examiner

SIMULATED GAS SUPPLY APPARATUS

CROSS-REFERENCE TO RELATED APPLICATIONS

This application is a continuation of International Application No. PCT/JP2012/068215, filed Jul. 18, 2012, which claims priority pursuant to 35 U.S.C. §119(a) to Japanese Patent Application No. 2011-228767, filed on Oct. 18, 2011. These applications are hereby incorporated by reference in their entirety.

BACKGROUND OF THE INVENTION

1. Field of the Invention

One or more embodiments of the present invention relates to a simulated gas supply apparatus for supplying a simulated gas which is used for evaluating a catalyst or a sensor built in an exhaust pipe of a vehicle or the like.

2. Background Art

When a catalyst or a sensor built in an exhaust pipe connected with an engine of a vehicle is evaluated, concentrations of each component gas contained in an exhaust gas from the vehicle are preliminarily measured, and a simulated gas consisting of the same components as those of the exhaust gas is generated, and then the catalyst or the sensor is evaluated by using the simulated gas. For example, a mixed gas is generated by mixing $CO$, $CO_2$, $NO$, $NO_2$, $HC$ and $N_2$ gases supplied from each source and adjusting the flow rate of the gases, and then the mixed gas is heated and moisture is added to the mixed gas, whereby the simulated gas is generated. The simulated gas is supplied to a cell containing a test object such as the catalyst, and the concentration of the simulated gas is measured before and after the simulated gas passes through the catalyst, whereby purification performance of the catalyst is evaluated.

A NOx storage-reduction catalyst absorbs NOx when an air-fuel ratio of the exhaust gas is lean, and releases the absorbed NOx when the air-fuel ratio of the exhaust gas is rich. When the purification performance of the catalyst decreases, an internal combustion having the NOx storage-reduction catalyst changes operating conditions in such a way that the air-fuel ratio becomes rich. Thus, NOx contained in the exhaust gas can be purified (see Patent Document 1). In the internal combustion, NOx contained in the exhaust gas can be reduced by properly changing the lean and stoichiometric or rich conditions. The concentration of the exhaust gas is detected by a sensor, and the lean, stoichiometric and rich conditions are identified. NOx contained in the exhaust gas is detected by a NOx sensor, and the level of the purification of NOx is checked.

For an automobile exhaust gas regulation, some test modes are defined. For example, JC08 mode is well known in Japan and L4 mode is well known in U.S. When a test of the exhaust gas is carried out, a vehicle is placed on a chassis dynamometer and runs based on the defined test. An amount of each of air-pollution substances contained in the exhaust gas is measured based on a defined measurement method of the test. The air-pollution substances are measured by a gas analyzer, and a gas mileage of the vehicle is measured. Recently, the automobile exhaust gas regulations and the gas mileage standard become strict, whereby it is required that a catalyst evaluation test is carried out by using the simulated gas which changes in the same way as the change of the exhaust gas of the running vehicle based on the measurement mode.

In the conventional catalyst and sensor evaluation test, the simulated gas is changed by adding a rich or lean component to the simulated gas constantly supplied (see Patent Document 2). Thus, in order to change the concentrations of the simulated gas and the rich or lean component, the flow rates of each raw gas should be changed. However, when the flow rate of one of the raw gases is changed, those of the remaining raw gases are affected due to the change of the pressure in a flow pipe. In order to change the concentration and flow rate of the simulated gas, the flow rates of the raw gases should be changed. Thus, it takes several seconds to stabilize the flow rates of the raw gases. Each of the flow rates of the raw gases or each of the change ratios thereof are different from each other in accordance with required concentration and flow rate of the simulated gas, and time periods till when each of the flow rates of the raw gases become stabilized are different from each other, and therefore it is difficult to simulate the exhaust gas with high accuracy. Further, when the flow rates of the raw gases are changed, the concentration and flow rate of the simulated gas are fluctuated.

Patent Document 1: JP 2000-240429 A
Patent Document 2: JP 4194581 B

SUMMARY OF THE INVENTION

One or more embodiments of the present invention provide a simulated gas supply apparatus which can simulate the change of the concentration of the exhaust gas and supply the simulated gas changed corresponding to the change of the concentration of the exhaust gas.

A simulated gas supply apparatus according to one or more embodiments includes a raw gas source group constituted of a plurality of raw gas sources, a plurality of flow controller groups each of which is constituted of a plurality of flow controllers, each of the flow controllers being provided for each of the raw gas sources so as to control flow rates of each of the raw gas sources, a flow control system constituted of the flow controller groups, a primary supply pipe for supplying a simulated gas to an evaluation device, the simulated gas being supplied from each of the flow controller groups, a primary exhaust pipe for exhausting the simulated gas, a switching valve system constituted of a plurality of switching valves each of which is provided for each of the flow controller groups so as to switch the simulated gas flow between the primary supply pipe and the primary exhaust pipe, and a controlling unit for controlling the flow control system and the switching valve system, in which the controlling unit controls the flow control system and the switching valve system in such a way that each of the flow controller groups changes a flow rate of the simulated gas every time a first time is elapsed, each of the switching valves flows the simulated gas to the primary supply pipe every time the first time is elapsed, and maintains the simulated gas flow to the primary supply pipe during a second time shorter than the first time, whereby the simulated gas is supplied sequentially from each of the flow controller groups to the primary supply pipe every time the second time is elapsed.

According to one or more embodiments of a simulated gas supply apparatus, the second time is an equal for each of the flow controller groups, and the first time is defined as a value obtained by multiplying the second time by the number of the flow controller groups.

According to one or more embodiments of a simulated gas supply apparatus, the raw gas source group further includes a high-concentration raw gas source for supplying the raw gas with a higher concentration than a predetermined concentration; and a low-concentration raw gas source for supplying the raw gas with a lower concentration than the predetermined concentration, in which the controlling unit controls the raw gas source group in such a way that the raw gas is supplied from the high-concentration raw gas source when the concentration of the required raw gas is higher than the predetermined concentration, and the raw gas is supplied from the low-concentration raw gas source when the concentration of the required raw gas is lower than the predetermined concentration.

According one or more embodiments of the simulated gas supply apparatus, in a case where the concentration of the simulated gas supplied to the primary supply pipe is not changed during a third time longer than the second time, and then after the concentration of the simulated gas supplied to the primary supply pipe is changed, the controlling unit controls the flow control system in such a way that the simulated gas with a constant flow rate is supplied from one of the flow controller groups during the third time, and the simulated gas is not supplied, or the simulated gas with a very low flow rate is supplied from the remaining flow controller groups during a time determined by subtracting the first time from the third time.

According to one or more embodiments of the present invention, a simulated gas supply apparatus includes a plurality of flow controller groups each of which is constituted of a plurality of flow controllers for controlling flow rates of each of raw gases, a flow control system constituted of the flow controller groups, a switching valve system for switching a simulated gas flow between a supply pipe and an exhaust pipe, the simulated gas being supplied from each of the flow controller groups, a controlling unit for controlling the flow control system and the switching valve system.

The controlling unit controls the flow control system in such a way that each of the flow controller groups changes the concentration and flow rate of the simulated gas every time a first time is elapsed. The first time may be a time so as to stabilize the concentration and flow rate of the simulated gas supplied from the flow controller groups. Thereby, the concentration and flow rate of the simulated gas may be stabilized during the first time.

The controlling unit controls the switching valve system in such a way that each of the switching valves flows sequentially the simulated gas to the supply pipe every time the first time is elapsed, and maintains the simulated gas flow to the supply pipe during a second time shorter than the first time, whereby the simulated gas is supplied sequentially from each of the flow controller groups to the supply pipe every time the second time is elapsed. Thus, the simulated gas from the flow controller groups can be stabilized during the first time and supplied sequentially to the supply pipe, by which the simulated gas with a predetermined concentration and flow rate can be supplied to an evaluation device (a catalyst evaluation device, a sensor evaluation device and so on).

DETAILED DESCRIPTION

In embodiments of the invention, numerous specific details are set forth in order to provide a more thorough understanding of the invention. However, it will be apparent to one with ordinary skill in the art that the invention may be practiced without these specific details. In other instances, well-known features have not been described in detail to avoid obscuring the invention. One or more embodiments of a simulated gas supply apparatus will be explained below with reference to the accompanying drawings.

Figure 1:
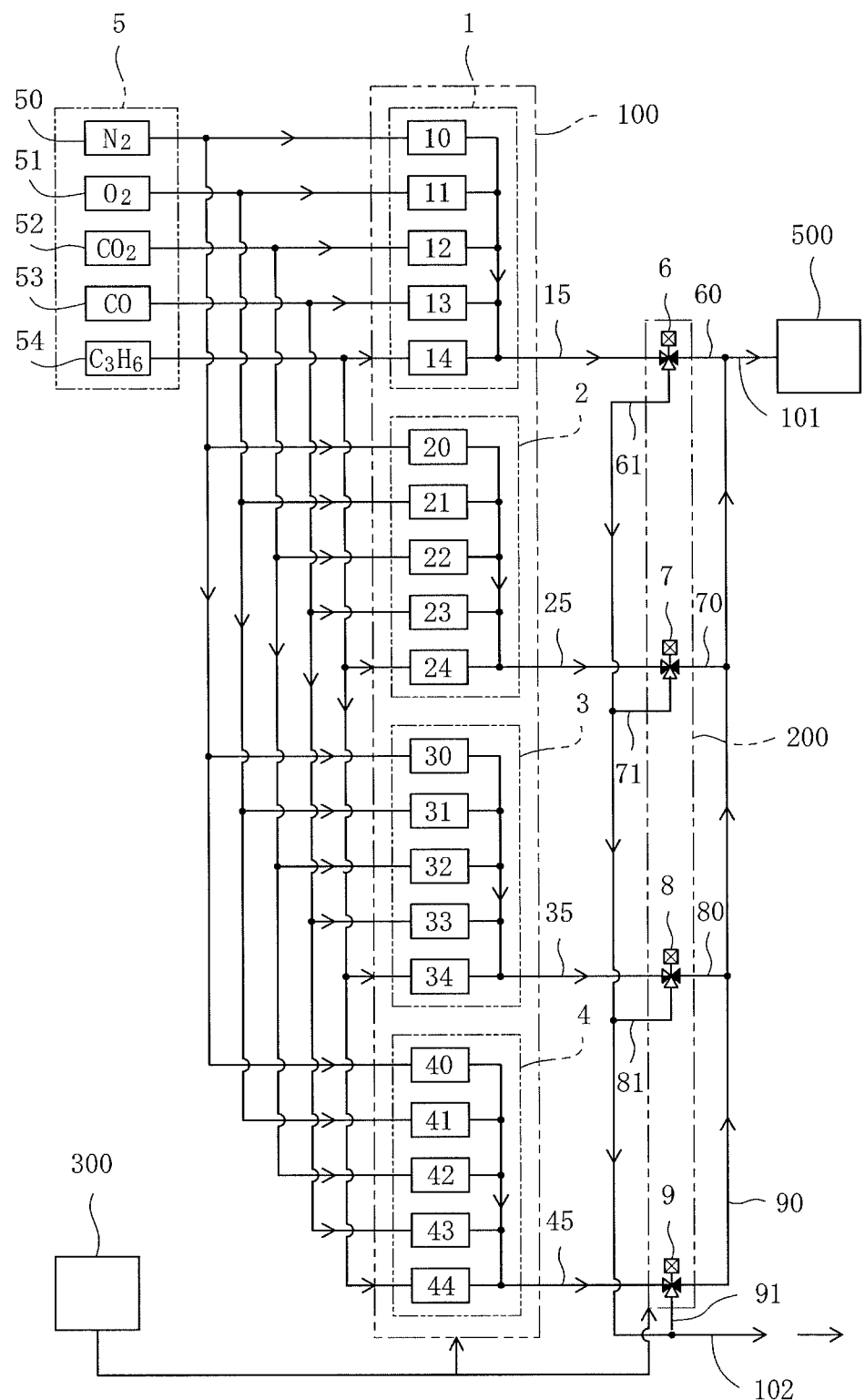
FIG. 1 is a schematic view illustrating a simulated gas supply apparatus according to one or more embodiments of the present invention.

As shown in FIG. 1, the apparatus comprises a raw gas source group 5. The raw gas source group 5 is constituted of an $N_2$ gas source 50, an $O_2$ gas source 51, a $CO_2$ gas source 52, a CO gas source 53 and a $C_3H_6$ gas source 54. The $N_2$ gas source 50 supplies $N_2$ gas, the $O_2$ gas source 51 supplies $O_2$ gas, the $CO_2$ gas source 52 supplies $CO_2$ gas, the CO gas source 53 supplies CO gas, and the $C_3H_6$ gas source 54 supplies $C_3H_6$ gas. $N_2$ gas, $O_2$ gas, $CO_2$ gas, CO gas and $C_3H_6$ gas are raw gases for generating a simulated gas.

The apparatus further comprises a flow control system 100. The flow control system 100 is constituted of a first flow controller group 1, a second flow controller group 2, a third flow controller group 3 and a fourth flow controller group 4. The first flow controller group 1 is constituted of five flow controllers (mass flow controllers) 10 to 14. The second flow controller group 2 is constituted of five flow controllers (mass flow controllers) 20 to 24. The third flow controller group 3 is constituted of five flow controllers (mass flow controllers) 30 to 34. The fourth flow controller group 4 is constituted of five flow controllers (mass flow controllers) 40 to 44.

The flow controllers 10, 20, 30 and 40 are connected with the $N_2$ gas source 50 so as to control the flow rate of the $N_2$ gas from the $N_2$ gas source 50. The flow controllers 11, 21, 31 and 41 are connected with the $O_2$ gas source 51 so as to control the flow rate of the $O_2$ gas from the $O_2$ gas source 51. The flow controllers 12, 22, 32 and 42 are connected with the $CO_2$ gas source 52 so as to control the flow rate of the $CO_2$ gas from the $CO_2$ gas source 52. The flow controllers 13, 23, 33 and 43 are connected with the CO gas source 53 so as to control the flow rate of the CO gas from the CO gas source 53. The flow controllers 14, 24, 34 and 44 are connected with the $C_3H_6$ gas source 54 so as to control the flow rate of the $C_3H_6$ gas from the $C_3H_6$ gas source 54.

The flow controllers 10 to 14 of the first flow controller group 1 are connected with a first mixing pipe 15 at the outlet of the flow controllers 10 to 14. The flow rates of $N_2$ gas, $O_2$ gas, $CO_2$ gas, CO gas and $C_3H_6$ gas are controlled by the first flow controller group 1, and then the gases are mixed in the first mixing pipe 15 so as to generate the simulated gas. The flow controllers 20 to 24 of the second flow controller group 2 are connected with a second mixing pipe 25 at the outlet of the flow controllers 20 to 24. The flow rates of $N_2$ gas, $O_2$ gas, $CO_2$ gas, CO gas and $C_3H_6$ gas are controlled by the second flow controller group 2, and then the gases are mixed in the second mixing pipe 25 so as to generate the simulated gas. The flow controllers 30 to 34 of the third flow controller group 3 are connected with a third mixing pipe 35 at the outlet of the flow controllers 30 to 34. The flow rates of $N_2$ gas, $O_2$ gas, $CO_2$ gas, CO gas and $C_3H_6$ gas are controlled by the third flow controller group 3, and then the gases are mixed in the third mixing pipe 35 so as to generate the simulated gas. The flow controllers 40 to 44 of the fourth flow controller group 4 are connected with a fourth mixing pipe 45 at the outlet of the flow controllers 40 to 44. The flow rates of $N_2$ gas, $O_2$ gas, $CO_2$ gas, CO gas and $C_3H_6$ gas are controlled by the fourth flow controller group 4, and then the gases are mixed in the fourth mixing pipe 45 so as to generate the simulated gas.

The apparatus further comprises a switching valve system 200. The switching valve system 200 is constituted of a first, second, third and fourth switching valves 6, 7, 8 and 9.

The first switching valve 6 is connected with the first mixing pipe 15. The first switching valve 6 is further connected with a first supply and exhaust pipes 60 and 61 so as to switch the simulated gas flow between the first supply and exhaust pipes 60 and 61, the simulated gas being generated in the first mixing pipe 15. The second switching valve 7 is connected with the second mixing pipe 25. The second switching valve 7 is further connected with a second supply and exhaust pipes 70 and 71 so as to switch the simulated gas flow between the second supply and exhaust pipes 70 and 71, the simulated gas being generated in the second mixing pipe 25. The third switching valve 8 is connected with the third mixing pipe 35. The third switching valve 8 is further connected with a third supply and exhaust pipes 80 and 81 so as to switch the simulated gas flow between the third supply and exhaust pipes 80 and 81, the simulated gas being generated in the third mixing pipe 35. The fourth switching valve 9 is connected with the fourth mixing pipe 45. The fourth switching valve 9 is further connected with a fourth supply and exhaust pipes 90 and 91 so as to switch the simulated gas flow between the fourth supply and exhaust pipes 90 and 91, the simulated gas being generated in the fourth mixing pipe 45.

The first, second, third and fourth supply pipes 60, 70, 80 and 90 are connected with a primary supply pipe 101. The primary supply pipe 101 is connected with an evaluation device 500 such as a catalyst evaluation device. The simulated gas is supplied from the primary supply pipe 101 to the evaluation device 500 through the first, second, third or fourth supply pipe 60, 70, 80 and 90. The first, second, third and fourth exhaust pipes 61, 71, 81 and 91 are connected with a primary exhaust pipe 102. The primary exhaust pipe 102 is not connected with the evaluation device 500. The simulated gas is exhausted from the primary exhaust pipe 102 to the outside through the first, second, third or fourth exhaust pipe 61, 71, 81 and 91.

The apparatus further comprises a controlling unit 300. The controlling unit 300 controls the flow control system 100 and the switching valve system 200. The controlling unit 300 controls the flow control system 100 in such a way that the flow controller groups 1, 2, 3 and 4 changes the concentration and flow rate of the simulated gas every time a first time $T_1$ is elapsed. Further, the controlling unit 300 controls the switching valve system 200 in such a way that each of the switching valves 6, 7, 8 and 9 flows sequentially the simulated gas to the primary supply pipe 101 every time the second time $T_2$ is elapsed.

With reference to the following Tables 1 to 6, operations of the flow control system 100 and the switching system 200 controlled by the controlling unit 300 will be explained below.

Table 1 shows the change of the flow rates of the raw gases contained in the simulated gas after the start of the operation of the apparatus. In the first column (indicating "time (second)") of Table 1, the numerals 1, 2, ..., 14 represent the time intervals from 0 to 1 second, from 1 to 2 seconds, ..., from 13 to 14 seconds, respectively. The concentrations of component gases contained in an exhaust gas from a vehicle is preliminarily measured every time the second time $T_2$ is elapsed, and the simulated gas consisting of the same components as those of the exhaust gas can be supplied every time the second time $T_2$ is elapsed based on the measurement result.

The second time $T_2$ may be 0.5 to 2 seconds, and in one or more embodiments the second time $T_2$ is "one second". The first time $T_1$ is defined as a value obtained by multiplying the second time $T_2$ by the number of the flow controller groups 1, 2, 3 and 4 because the second time $T_2$ is an equal for each of the flow controller groups 1, 2, 3 and 4 in one or more embodiments. The apparatus in one or more embodiments comprises the four flow controller groups 1, 2, 3 and 4 so that the first time T1 is "four seconds (=one second×four)".

TABLE 1

| time(second) | $O_2$(ppm) | $CO_2$(ppm) | CO(ppm) | $C_3H_6$(ppm) |
|---|---|---|---|---|
| 1 | 213361 | 6194 | 0 | 28 |
| 2 | 213496 | 6183 | 0 | 53 |
| 3 | 197074 | 9212 | 0 | 1223 |
| 4 | 48554 | 101597 | 564 | 792 |
| 5 | 13632 | 137128 | 2087 | 766 |
| 6 | 14856 | 143342 | 2558 | 1093 |
| 7 | 7307 | 134882 | 3796 | 1235 |
| 8 | 6237 | 133647 | 5648 | 1262 |
| 9 | 5750 | 134055 | 7530 | 1315 |
| 10 | 5281 | 130966 | 9780 | 1318 |
| 11 | 5169 | 131441 | 12159 | 1302 |
| 12 | 5490 | 135309 | 14368 | 1192 |
| 13 | 6322 | 144129 | 15638 | 1120 |
| 14 | 8725 | 146139 | 16354 | 708 |

TABLE 2

| | the first flow controller group | | | |
|---|---|---|---|---|
| time(second) | $O_2$(ppm) | $CO_2$(ppm) | CO(ppm) | $C_3H_6$(ppm) |
| 1 | 213361 | 6194 | 0 | 28 |
| 2 | 13632 | 137128 | 2087 | 766 |
| 3 | 13632 | 137128 | 2087 | 766 |
| 4 | 13632 | 137128 | 2087 | 766 |
| 5 | 13632 | 137128 | 2087 | 766 |
| 6 | 5750 | 134055 | 7530 | 1315 |
| 7 | 5750 | 134055 | 7530 | 1315 |
| 8 | 5750 | 134055 | 7530 | 1315 |
| 9 | 5750 | 134055 | 7530 | 1315 |
| 10 | 6322 | 144129 | 15638 | 1120 |
| 11 | 6322 | 144129 | 15638 | 1120 |
| 12 | 6322 | 144129 | 15638 | 1120 |
| 13 | 6322 | 144129 | 15638 | 1120 |
| 14 | 10645 | 146422 | 15178 | 798 |

TABLE 3

| | the second flow controller group | | | |
|---|---|---|---|---|
| time(second) | $O_2$(ppm) | $CO_2$(ppm) | CO(ppm) | $C_3H_6$(ppm) |
| 1 | 213496 | 6183 | 0 | 53 |
| 2 | 213496 | 6183 | 0 | 53 |
| 3 | 14856 | 143342 | 2558 | 1093 |
| 4 | 14856 | 143342 | 2558 | 1093 |
| 5 | 14856 | 143342 | 2558 | 1093 |
| 6 | 14856 | 143342 | 2558 | 1093 |
| 7 | 5281 | 130966 | 9780 | 1318 |
| 8 | 5281 | 130966 | 9780 | 1318 |
| 9 | 5281 | 130966 | 9780 | 1318 |
| 10 | 5281 | 130966 | 9780 | 1318 |
| 11 | 8725 | 146139 | 16354 | 708 |
| 12 | 8725 | 146139 | 16354 | 708 |
| 13 | 8725 | 146139 | 16354 | 708 |
| 14 | 8725 | 146139 | 16354 | 708 |

TABLE 4

| | the third flow controller group | | | |
|---|---|---|---|---|
| time(second) | $O_2$(ppm) | $CO_2$(ppm) | CO(ppm) | $C_3H_6$(ppm) |
| 1 | 197074 | 9212 | 0 | 1223 |
| 2 | 197074 | 9212 | 0 | 1223 |
| 3 | 197074 | 9212 | 0 | 1223 |
| 4 | 7307 | 134882 | 3796 | 1235 |
| 5 | 7307 | 134882 | 3796 | 1235 |
| 6 | 7307 | 134882 | 3796 | 1235 |
| 7 | 7307 | 134882 | 3796 | 1235 |
| 8 | 5169 | 131441 | 12159 | 1302 |
| 9 | 5169 | 131441 | 12159 | 1302 |
| 10 | 5169 | 131441 | 12159 | 1302 |
| 11 | 5169 | 131441 | 12159 | 1302 |
| 12 | 13845 | 144952 | 16654 | 674 |
| 13 | 13845 | 144952 | 16654 | 674 |
| 14 | 13845 | 144952 | 16654 | 674 |

TABLE 5

| | the fourth flow controller group | | | |
|---|---|---|---|---|
| time(second) | $O_2$(ppm) | $CO_2$(ppm) | CO(ppm) | $C_3H_6$(ppm) |
| 1 | 48554 | 101597 | 564 | 792 |
| 2 | 48554 | 101597 | 564 | 792 |
| 3 | 48554 | 101597 | 564 | 792 |
| 4 | 48554 | 101597 | 564 | 792 |
| 5 | 6237 | 133647 | 5648 | 1262 |
| 6 | 6237 | 133647 | 5648 | 1262 |
| 7 | 6237 | 133647 | 5648 | 1262 |
| 8 | 6237 | 133647 | 5648 | 1262 |
| 9 | 5490 | 135309 | 14368 | 1192 |
| 10 | 5490 | 135309 | 14368 | 1192 |
| 11 | 5490 | 135309 | 14368 | 1192 |
| 12 | 5490 | 135309 | 14368 | 1192 |
| 13 | 10612 | 146362 | 16785 | 708 |
| 14 | 10612 | 146362 | 16785 | 708 |

Tables 2 to 5 show the change of the flow rates of the raw gases contained in the simulated gas from the flow controller groups 1, 2, 3 and 4 every time four seconds (the first time $T_1$) are elapsed after the start of the operation of the apparatus. In the first column (indicating "time(second)") of Tables 2 to 5, the numerals 1, 2, . . . , 14 represent the time intervals from 0 to 1 second, from 1 to 2 seconds, . . . , from 13 to 14 seconds, respectively.

As shown in Table 2, the first flow controller group 1 changes the flow rates of the raw gases by the flow controllers 10 to 14 every time four seconds (the first time $T_1$) are elapsed after the start of the operation. The first switching valve 6 flows the simulated gas from the first flow controller group 1 to the evaluation device 500 through the primary supply pipe 101 during one second (the second time $T_2$) every time four seconds (the first time $T_1$) are elapsed after the start of the operation, see rows enclosed by heavy-line in Table 2.

As shown in Table 2, the simulated gas is supplied from the first flow controller group 1 to the evaluation device 5 during a time from 0 to 1 second (one second (=the second time $T_2$)). After 1 second is elapsed, the first flow controller group 1 flows the simulated gas whose the flow rates of the raw gases are equal to those of the simulated gas to be supplied during a time from 4 to 5 seconds. The simulated gas is exhausted from the first flow controller group 1 to the outside through the primary exhaust pipe 102 during a time from 1 to 4 seconds. The concentration and flow rate of the simulated gas become stabilized during a time from 1 to 4 seconds. And then, the simulated gas is supplied from the first flow controller group 1 to the evaluation device 500 during a time from 4 to 5 seconds (one second (=the second time $T_2$)). In the same way, the simulated gas is supplied from the first flow controller group 1 to the evaluation device 500 during times from 8 to 9 seconds (one second (=the second time $T_2$)), and from 12 to 13 seconds (one second (=the second time $T_2$)).

As shown in Tables 3 to 5, the second, third and fourth flow controller groups 2, 3 and 4 change the flow rates of the raw gases by the flow controllers 20 to 24, 30 to 34 and 40 to 44 every time four seconds (=the first time $T_1$) are elapsed after the start of the operation. Each of the second, third and fourth switching valves 7, 8 and 9 flows sequentially the simulated gas from each of the second, third and fourth flow controller groups 2, 3 and 4 to the evaluation device 500 through the primary supply pipe 101 during one second (=the second time $T_2$) every time four seconds (=the first time $T_1$) are elapsed after the start of the operation, see rows enclosed by heavy-line in Tables 3 to 5.

Every time one second (=the second time $T_2$) is elapsed after the start of the operation, the simulated gas is supplied from the first flow controller group 1 to the evaluation device 500, and then the simulated gas is supplied from the second flow controller group 2 to the evaluation device 500, and then the simulated gas is supplied from the third flow controller group 3 to the evaluation device 500, and then the simulated gas is supplied from the fourth flow controller group 4 to the evaluation device 500.

That is to say, the simulated gas is supplied from the first flow controller group 1 to the evaluation device 500 during a time from 0 to 1 second (one second (=the second time $T_2$)), and then the simulated gas is supplied from the second flow controller group 2 to the evaluation device 500 during a time from 1 to 2 seconds (one second (=the second time $T_2$)), and then the simulated gas is supplied from the third flow controller group 3 to the evaluation device 500 during a time from 2 to 3 seconds (one second (=the second time $T_2$)), and then the simulated gas is supplied from the fourth flow controller group 4 to the evaluation device 500 during a time from 3 to 4 seconds (one second (=the second time $T_2$)), and then the simulated gas is supplied from the first flow controller group 1 to the evaluation device 500 during a time from 4 to 5 seconds (one second (=the second time $T_2$)).

Every time one second (=the second time $T_2$) is elapsed after the start of the operation, the simulated gas is supplied sequentially from the first, second, third and fourth flow controller groups 1, 2, 3 and 4 to the primary supply pipe 101.

As shown in Table 2, the simulated gas is supplied from the first flow controller group 1 to the evaluation device 500 through the primary supply pipe 101 during times from 0 to 1 second, from 4 to 5 seconds, from 8 to 9 seconds, and from 12 to 13 seconds, but during the rest of the times, the simulated gas is exhausted to the outside through the primary exhaust pipe 102. During three seconds (=the first time $T_1$ minus the second time $T_2$) from 1 to 4 seconds, from 5 to 8 seconds, and from 9 to 12 seconds, the simulated gas is exhausted from the first flow controller group 1 to the outside so that the concentration and flow rate of the simulated gas can become stabilized. In the same way, during three seconds (=the first time $T_1$ minus the second time $T_2$), the simulated gas is exhausted from the second, third and fourth control groups 2, 3 and 4 so that the concentration and flow rate of the simulated gas can become stabilized. Thereby, the simulated gas with stable concentration and flow rate is supplied sequentially to the evaluation device 500.

TABLE 6

| time(second) | the simulated gas supplied from |
|---|---|
| 1 | the first flow controller group |
| 2 | the second flow controller group |
| 3 | the third flow controller group |
| 4 | the fourth flow controller group |
| 5 | the first flow controller group |
| 6 | the second flow controller group |
| 7 | the third flow controller group |
| 8 | the fourth flow controller group |
| 9 | the first flow controller group |
| 10 | the second flow controller group |
| 11 | the third flow controller group |
| 12 | the fourth flow controller group |
| 13 | the first flow controller group |
| 14 | the second flow controller group |

Table 6 shows the order of supply of the simulated gas from the four flow controller groups to the evaluation device 500 every time one second (the second time $T_2$) is elapsed. As shown in Table 6, four seconds (the first time $T_1$) represents one cycle of supply of the simulated gas from a flow controller group, and the simulated gas is supplied sequentially from each of the four flow controller groups 1, 2, 3 and 4 to the evaluation device 500 every time one second (the second time $T_2$) is elapsed.

Figure 2:
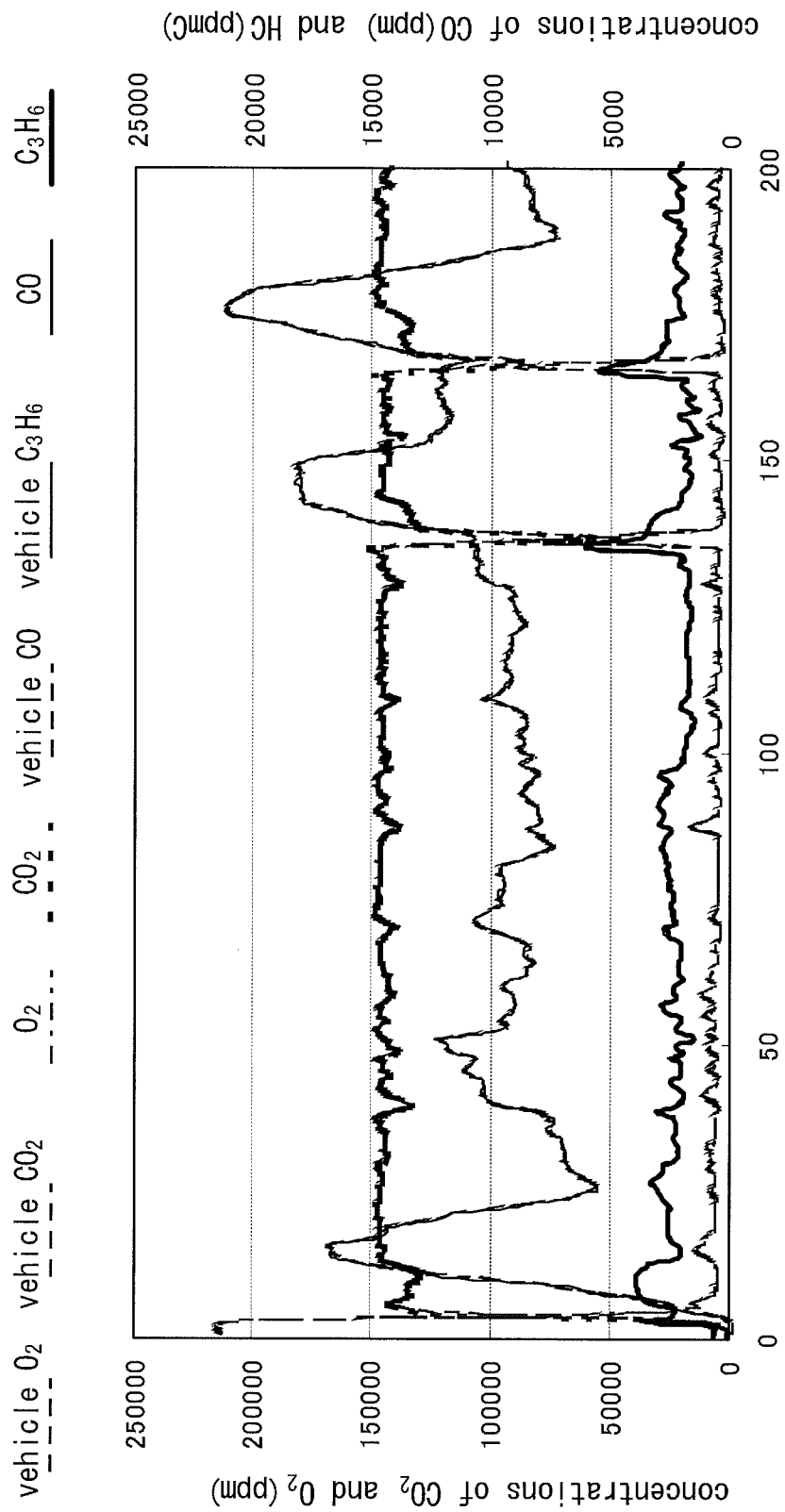
FIG. 2 is a graph plotting change of concentrations of raw gases of a simulated gas and that of gas components of an exhausted gas over time according to one or more embodiments of the present invention.

As shown in FIG. 2, it will be understood that both of the change of the concentration of each of the raw gases contained in the simulated gas from the apparatus and that of each of the component gases contained in the exhausted gas correspond with each other. For example, in FIG. 2, "vehicle $O_2$" represents $O_2$ contained in the exhaust gas from the vehicle, and "$O_2$" represents $O_2$ contained in the simulated gas from the apparatus.

Additional embodiments of the apparatus will be explained below. Detailed explanation about the same constructions as in the above embodiments is omitted.

In one or more embodiments, the raw gas source group 5 comprises a high-concentration raw gas source for supplying a raw gas with a higher concentration than a predetermined concentration, and a low-concentration raw gas source for supplying a raw gas with a lower concentration than the predetermined concentration. Regarding the $O_2$ gas, a 100% $O_2$ gas source for supplying the $O_2$ gas with 100% concentration and a 10% $O_2$ gas source for supplying the $O_2$ gas with 10% concentration are provided. Regarding the CO gas, a 100% CO gas source for supplying the CO gas with 100% concentration and a 10% CO gas source for supplying the CO gas with 10% concentration are provided. Regarding the $C_3H_6$ gas, a 20% $C_3H_6$ gas source for supplying the $C_3H_6$ gas with 20% concentration and a 2% $C_3H_6$ gas source for supplying the $C_3H_6$ gas with 2% concentration are provided.

For example, the concentration of the $O_2$ gas changes within the range of 0 to 21% of the simulated gas. If only the 100% $O_2$ gas source is provided, when the $O_2$ gas with very low concentration (for example 1%) should be supplied, it takes a long time to stabilize the concentration and flow rate of $O_2$ gas at a predetermined value because the supply of the $O_2$ gas is required at very low flow rate and slow speed. Thus, the 100% and 10% $O_2$ gas sources are provided. When the $O_2$ gas with a higher concentration than a predetermined concentration (for example 2.1%) should be supplied, the $O_2$ gas is supplied from the 100% $O_2$ gas source. On the other hand, when the $O_2$ gas with a lower concentration than the predetermined concentration should be supplied, the $O_2$ gas is supplied from the 10% $O_2$ gas source. The $O_2$ gas can be supplied at high flow rate and high speed even if the concentration of the $O_2$ gas is low, whereby it is possible to stabilize the concentration and flow rate of the $O_2$ gas at the predetermined value in a short time.

Tables 7 to 10 show the change of the flow rates of the raw gases contained in the simulated gas from the raw gas sources after the start of the operation of the apparatus with respect to each of the first, second, third and fourth flow controller groups 1, 2, 3 and 4. In the first column (indicating "time (second)") of Tables 7 to 10, the numerals 1, 2, . . . , 13 mean the time intervals from 0 to 1 second, from 1 to 2 seconds, . . . , from 12 to 13 seconds, respectively. The simulated gas is supplied sequentially from the first, second, third and fourth flow controller groups 1, 2, 3 and 4 to the evaluation device 500 at a constant time interval as indicated in rows enclosed by heavy-line in Tables 7 to 10.

TABLE 7

| | the first controller group (ml/min) | | | | | | | |
|---|---|---|---|---|---|---|---|---|
| time (second) | 100% $N_2$ | 100% $O_2$ | 10% $O_2$ | 100% $CO_2$ | 100% CO | 10% CO | 20% $C_3H_6$ | 2% $C_3H_6$ |
| 1 | 6976 | 5334 | 0 | 155 | 0 | 0 | 0 | 35 |
| 2 | 4185 | 0 | 3408 | 3428 | 0 | 522 | 0 | 958 |
| 3 | 4185 | 0 | 3408 | 3428 | 0 | 522 | 0 | 958 |
| 4 | 4185 | 0 | 3408 | 3428 | 0 | 522 | 0 | 958 |
| 5 | 4185 | 0 | 3408 | 3428 | 0 | 522 | 0 | 958 |
| 6 | 7358 | 0 | 1438 | 3351 | 188 | 0 | 164 | 0 |
| 7 | 7358 | 0 | 1438 | 3351 | 188 | 0 | 164 | 0 |
| 8 | 7358 | 0 | 1438 | 3351 | 188 | 0 | 164 | 0 |
| 9 | 7358 | 0 | 1438 | 3351 | 188 | 0 | 164 | 0 |
| 10 | 6785 | 0 | 1580 | 3603 | 391 | 0 | 140 | 0 |
| 11 | 6785 | 0 | 1580 | 3603 | 391 | 0 | 140 | 0 |
| 12 | 6785 | 0 | 1580 | 3603 | 391 | 0 | 140 | 0 |
| 13 | 6785 | 0 | 1580 | 3603 | 391 | 0 | 140 | 0 |
| 14 | 4801 | 0 | 2661 | 3661 | 379 | 0 | 0 | 998 |

TABLE 8

| | the second controller group (ml/min) | | | | | | | |
|---|---|---|---|---|---|---|---|---|
| time (second) | 100% $N_2$ | 100% $O_2$ | 10% $O_2$ | 100% $CO_2$ | 100% CO | 10% CO | 20% $C_3H_6$ | 2% $C_3H_6$ |
| 1 | 6942 | 5337 | 0 | 155 | 0 | 0 | 0 | 66 |
| 2 | 6942 | 5337 | 0 | 155 | 0 | 0 | 0 | 66 |
| 3 | 4426 | 0 | 3714 | 3584 | 0 | 640 | 137 | 0 |
| 4 | 4426 | 0 | 3714 | 3584 | 0 | 640 | 137 | 0 |
| 5 | 4426 | 0 | 3714 | 3584 | 0 | 640 | 137 | 0 |
| 6 | 4426 | 0 | 3714 | 3584 | 0 | 640 | 137 | 0 |
| 7 | 7496 | 0 | 1320 | 3274 | 244 | 0 | 165 | 0 |
| 8 | 7496 | 0 | 1320 | 3274 | 244 | 0 | 165 | 0 |
| 9 | 7496 | 0 | 1320 | 3274 | 244 | 0 | 165 | 0 |
| 10 | 7496 | 0 | 1320 | 3274 | 244 | 0 | 165 | 0 |
| 11 | 5371 | 0 | 2181 | 3653 | 409 | 0 | 0 | 885 |
| 12 | 5371 | 0 | 2181 | 3653 | 409 | 0 | 0 | 885 |
| 13 | 5371 | 0 | 2181 | 3653 | 409 | 0 | 0 | 885 |
| 14 | 5371 | 0 | 2181 | 3653 | 409 | 0 | 0 | 885 |

TABLE 9

| | the third controller group (ml/min) | | | | | | | |
|---|---|---|---|---|---|---|---|---|
| time (second) | 100% $N_2$ | 100% $O_2$ | 10% $O_2$ | 100% $CO_2$ | 100% CO | 10% CO | 20% $C_3H_6$ | 2% $C_3H_6$ |
| 1 | 7190 | 4927 | 0 | 230 | 0 | 0 | 153 | 0 |
| 2 | 7190 | 4927 | 0 | 230 | 0 | 0 | 153 | 0 |
| 3 | 7190 | 4927 | 0 | 230 | 0 | 0 | 153 | 0 |
| 4 | 6198 | 0 | 1827 | 3372 | 0 | 949 | 154 | 0 |
| 5 | 6198 | 0 | 1827 | 3372 | 0 | 949 | 154 | 0 |
| 6 | 6198 | 0 | 1827 | 3372 | 0 | 949 | 154 | 0 |
| 7 | 6198 | 0 | 1827 | 3372 | 0 | 949 | 154 | 0 |
| 8 | 7455 | 0 | 1292 | 3286 | 304 | 0 | 163 | 0 |
| 9 | 7455 | 0 | 1292 | 3286 | 304 | 0 | 163 | 0 |
| 10 | 7455 | 0 | 1292 | 3286 | 304 | 0 | 163 | 0 |
| 11 | 7455 | 0 | 1292 | 3286 | 304 | 0 | 163 | 0 |
| 12 | 4156 | 0 | 3461 | 3624 | 416 | 0 | 0 | 842 |
| 13 | 4156 | 0 | 3461 | 3624 | 416 | 0 | 0 | 842 |
| 14 | 4156 | 0 | 3461 | 3624 | 416 | 0 | 0 | 842 |

TABLE 10

| | the fourth controller group (ml/min) | | | | | | | |
|---|---|---|---|---|---|---|---|---|
| time (second) | 100% $N_2$ | 100% $O_2$ | 10% $O_2$ | 100% $CO_2$ | 100% CO | 10% CO | 20% $C_3H_6$ | 2% $C_3H_6$ |
| 1 | 7615 | 1214 | 0 | 2540 | 0 | 141 | 0 | 990 |
| 2 | 7615 | 1214 | 0 | 2540 | 0 | 141 | 0 | 990 |
| 3 | 7615 | 1214 | 0 | 2540 | 0 | 141 | 0 | 990 |
| 4 | 7615 | 1214 | 0 | 2540 | 0 | 141 | 0 | 990 |
| 5 | 6030 | 0 | 1559 | 3341 | 0 | 1412 | 158 | 0 |
| 6 | 6030 | 0 | 1559 | 3341 | 0 | 1412 | 158 | 0 |
| 7 | 6030 | 0 | 1559 | 3341 | 0 | 1412 | 158 | 0 |
| 8 | 6030 | 0 | 1559 | 3341 | 0 | 1412 | 158 | 0 |
| 9 | 7237 | 0 | 1372 | 3383 | 359 | 0 | 149 | 0 |
| 10 | 7237 | 0 | 1372 | 3383 | 359 | 0 | 149 | 0 |
| 11 | 7237 | 0 | 1372 | 3383 | 359 | 0 | 149 | 0 |
| 12 | 7237 | 0 | 1372 | 3383 | 359 | 0 | 149 | 0 |
| 13 | 4883 | 0 | 2653 | 3659 | 420 | 0 | 0 | 885 |
| 14 | 4883 | 0 | 2653 | 3659 | 420 | 0 | 0 | 885 |

Additional embodiments of the apparatus will be explained below. Detailed explanation about the same constructions as in the above embodiments is omitted.

TABLE 11

| time (second) | $O_2$ (ppm) | $CO_2$ (ppm) | CO (ppm) | $C_3H_6$ (ppm) | the simulated gas supplied from |
|---|---|---|---|---|---|
| 1 | 213361 | 6194 | 0 | 28 | the first flow controller group |
| 2 | 213496 | 6183 | 0 | 53 | the second flow controller group |
| 3 | 197074 | 9212 | 0 | 1223 | the third flow controller group |
| 4 | 48554 | 101597 | 564 | 792 | the fourth flow controller group |

TABLE 11-continued

| time (second) | $O_2$ (ppm) | $CO_2$ (ppm) | CO (ppm) | $C_3H_6$ (ppm) | the simulated gas supplied from |
|---|---|---|---|---|---|
| 5 | 13632 | 137128 | 2087 | 766 | the first flow controller group |
| 6 | 14856 | 143342 | 2558 | 1093 | the second flow controller group |
| 7 | 7307 | 134882 | 3796 | 1235 | the third flow controller group |
| 8 | 6237 | 133647 | 5648 | 1262 | the fourth flow controller group |
| 9 | 5750 | 134055 | 7530 | 1315 | the first flow controller group |
| 10 | 5281 | 130966 | 9780 | 1318 | the second flow controller group |
| 11 | 5169 | 131441 | 12159 | 1302 | the third flow controller group |
| 12 | 5490 | 135309 | 14368 | 1192 | the fourth flow controller group |
| 13 | 6322 | 144129 | 15638 | 1120 | the first flow controller group |
| 14 | 8725 | 146139 | 16354 | 708 | the second flow controller group |
| 15 | 8725 | 146139 | 16354 | 708 | |
| 16 | 8725 | 146139 | 16354 | 708 | |
| 17 | 8725 | 146139 | 16354 | 708 | |
| 18 | 8725 | 146139 | 16354 | 708 | |
| 19 | 8725 | 146139 | 16354 | 708 | |
| 20 | 8725 | 146139 | 16354 | 708 | |
| 21 | 8725 | 146139 | 16354 | 708 | |
| 22 | 8725 | 146139 | 16354 | 708 | |
| 23 | 8725 | 146139 | 16354 | 708 | |
| 24 | 8725 | 146139 | 16354 | 708 | |
| 25 | 8725 | 146139 | 16354 | 708 | |
| 26 | 8725 | 146139 | 16354 | 708 | |
| 27 | 8725 | 146139 | 16354 | 708 | |
| 28 | 8725 | 146139 | 16354 | 708 | |
| 29 | 8725 | 146139 | 16354 | 708 | |
| 30 | 8725 | 146139 | 16354 | 708 | |
| 31 | 8725 | 146139 | 16354 | 708 | |
| 32 | 8725 | 146139 | 16354 | 708 | |
| 33 | 8510 | 137393 | 12069 | 2675 | the third flow controller group |
| 34 | 10745 | 138462 | 10260 | 2277 | the fourth flow controller group |
| 35 | 9581 | 138164 | 10400 | 3934 | the first flow controller group |
| 36 | 8140 | 138315 | 12096 | 4482 | the second flow controller group |
| 37 | 9242 | 137865 | 12720 | 3410 | the third flow controller group |
| 38 | 12407 | 136616 | 10677 | 4541 | the fourth flow controller group |
| 39 | 7157 | 138234 | 12754 | 4923 | the first flow controller group |
| 40 | 8150 | 137964 | 12202 | 4904 | the second flow controller group |
| 41 | 6532 | 139296 | 12240 | 5345 | the third flow controller group |
| 42 | 9234 | 138882 | 10782 | 5161 | the fourth flow controller group |
| 43 | 7748 | 139109 | 11407 | 4901 | the first flow controller group |
| 44 | 7003 | 139228 | 11809 | 4851 | the second flow controller group |
| 45 | 6459 | 139564 | 11822 | 4837 | the third flow controller group |
| 46 | 7749 | 139215 | 11415 | 3825 | the fourth flow controller group |

Table 11 shows the change of the flow rates of the raw gases contained in the simulated gas after the start of the operation of the apparatus. In the first column (indicating "time (second)") of Table 11, the numerals 1, 2, . . . , 46 represent the time intervals from 0 to 1 second, from 1 to 2 seconds, . . . , from 45 to 46 seconds, respectively.

As shown in Table 11, similarly to the one or more of the above embodiments, during a time from 0 to 13 seconds, the simulated gas should be supplied sequentially from the first, second, third and fourth flow controller groups 1, 2, 3 and 4 to the primary supply pipe 101 every time one second (the second time $T_2$) is elapsed because the component concentration of the simulated gas should be changed. And then, during a time from 13 to 32 seconds (during a third time $T_3$ longer than the second time $T_2$), the simulated gas is supplied not from the first, third and fourth flow controller groups 1, 3 and 4 but from only the second flow controller group 2 because the component concentration of the simulated gas should not be changed. And then, similarly to the one or more of the above embodiments, after 32 seconds are elapsed, the simulated gas is supplied sequentially from the first, second, third and fourth flow controller groups 1, 2, 3 and 4 to the primary supply pipe 101 every time one second (the second time $T_2$) is elapsed because the component concentration of the simulated gas should be changed.

TABLE 12

| | the first flow controller group | | | |
|---|---|---|---|---|
| time(second) | $O_2$(ppm) | $CO_2$(ppm) | CO(ppm) | $C_3H_6$(ppm) |
| 1 | 213361 | 6194 | 0 | 28 |
| 2 | 13632 | 137128 | 2087 | 766 |
| 3 | 13632 | 137128 | 2087 | 766 |
| 4 | 13632 | 137128 | 2087 | 766 |
| 5 | 13632 | 137128 | 2087 | 766 |
| 6 | 5750 | 134055 | 7530 | 1315 |
| 7 | 5750 | 134055 | 7530 | 1315 |
| 8 | 5750 | 134055 | 7530 | 1315 |
| 9 | 5750 | 134055 | 7530 | 1315 |
| 10 | 6322 | 144129 | 15638 | 1120 |
| 11 | 6322 | 144129 | 15638 | 1120 |
| 12 | 6322 | 144129 | 15638 | 1120 |
| 13 | 6322 | 144129 | 15638 | 1120 |
| 14 | 0 | 0 | 0 | 0 |
| 15 | 0 | 0 | 0 | 0 |
| 16 | 0 | 0 | 0 | 0 |
| 17 | 0 | 0 | 0 | 0 |
| 18 | 0 | 0 | 0 | 0 |
| 19 | 0 | 0 | 0 | 0 |
| 20 | 0 | 0 | 0 | 0 |
| 21 | 0 | 0 | 0 | 0 |
| 22 | 0 | 0 | 0 | 0 |
| 23 | 0 | 0 | 0 | 0 |
| 24 | 0 | 0 | 0 | 0 |
| 25 | 0 | 0 | 0 | 0 |
| 26 | 0 | 0 | 0 | 0 |
| 27 | 0 | 0 | 0 | 0 |
| 28 | 0 | 0 | 0 | 0 |
| 29 | 0 | 0 | 0 | 0 |
| 30 | 0 | 0 | 0 | 0 |
| 31 | 0 | 0 | 0 | 0 |
| 32 | 9581 | 138164 | 10400 | 3934 |
| 33 | 9581 | 138164 | 10400 | 3934 |
| 34 | 9581 | 138164 | 10400 | 3934 |
| 35 | 9581 | 138164 | 10400 | 3934 |
| 36 | 7157 | 138234 | 12754 | 4923 |
| 37 | 7157 | 138234 | 12754 | 4923 |
| 38 | 7157 | 138234 | 12754 | 4923 |
| 39 | 7157 | 138234 | 12754 | 4923 |
| 40 | 7748 | 139109 | 11407 | 4901 |
| 41 | 7748 | 139109 | 11407 | 4901 |
| 42 | 7748 | 139109 | 11407 | 4901 |
| 43 | 7748 | 139109 | 11407 | 4901 |

As shown in Table 12, during a time from 0 to 13 seconds, the flow rates of the raw gases are changed by the first flow controller group 1 every time four seconds (the first time $T_1$) are elapsed. During a time from 13 to 31 seconds, the flow rates of the raw gases are set to be zero (or very low) by the first flow controller group 1 because the flow rates of the raw gases need not be changed.

And then, after 31 seconds are elapsed, the flow rates of the raw gases are changed by the first flow controller group 1 every time four seconds (=the first time $T_1$) are elapsed. As shown in Table 11, during a time from 34 to 35 seconds, the simulated gas is supplied from the first flow controller group 1 to the primary supply pipe 101. After 31 seconds determined by subtracting three seconds (=the first time $T_1$ minus the second time $T_2$) from 34 seconds are elapsed, the flow rates of the raw gases are changed by the first flow controller group 1 every time four seconds (=the first time $T_1$) are elapsed. During three seconds from 31 to 34 seconds, the simulated gas is exhausted from the first flow controller group 1 to the outside so that the concentration and flow rate of the simulated gas become stabilized.

TABLE 13 the second flow controller group

| time(second) | $O_2$(ppm) | $CO_2$(ppm) | CO(ppm) | $C_3H_6$(ppm) |
|---|---|---|---|---|
| 1 | 213496 | 6183 | 0 | 53 |
| 2 | 213496 | 6183 | 0 | 53 |
| 3 | 14856 | 143342 | 2558 | 1093 |
| 4 | 14856 | 143342 | 2558 | 1093 |
| 5 | 14856 | 143342 | 2558 | 1093 |
| 6 | 14856 | 143342 | 2558 | 1093 |
| 7 | 5281 | 130966 | 9780 | 1318 |
| 8 | 5281 | 130966 | 9780 | 1318 |
| 9 | 5281 | 130966 | 9780 | 1318 |
| 10 | 5281 | 130966 | 9780 | 1318 |
| 11 | 8725 | 146139 | 16354 | 708 |
| 12 | 8725 | 146139 | 16354 | 708 |
| 13 | 8725 | 146139 | 16354 | 708 |
| 14 | 8725 | 146139 | 16354 | 708 |
| 15 | 8725 | 146139 | 16354 | 708 |
| 16 | 8725 | 146139 | 16354 | 708 |
| 17 | 8725 | 146139 | 16354 | 708 |
| 18 | 8725 | 146139 | 16354 | 708 |
| 19 | 8725 | 146139 | 16354 | 708 |
| 20 | 8725 | 146139 | 16354 | 708 |
| 21 | 8725 | 146139 | 16354 | 708 |
| 22 | 8725 | 146139 | 16354 | 708 |
| 23 | 8725 | 146139 | 16354 | 708 |
| 24 | 8725 | 146139 | 16354 | 708 |
| 25 | 8725 | 146139 | 16354 | 708 |
| 26 | 8725 | 146139 | 16354 | 708 |
| 27 | 8725 | 146139 | 16354 | 708 |
| 28 | 8725 | 146139 | 16354 | 708 |
| 29 | 8725 | 146139 | 16354 | 708 |
| 30 | 8725 | 146139 | 16354 | 708 |
| 31 | 8725 | 146139 | 16354 | 708 |
| 32 | 8725 | 146139 | 16354 | 708 |
| 33 | 8140 | 138315 | 12096 | 4482 |
| 34 | 8140 | 138315 | 12096 | 4482 |
| 35 | 8140 | 138315 | 12096 | 4482 |
| 36 | 8140 | 138315 | 12096 | 4482 |
| 37 | 8150 | 137964 | 12202 | 4904 |
| 38 | 8150 | 137964 | 12202 | 4904 |
| 39 | 8150 | 137964 | 12202 | 4904 |
| 40 | 8150 | 137964 | 12202 | 4904 |
| 41 | 7003 | 139228 | 11809 | 4851 |
| 42 | 7003 | 139228 | 11809 | 4851 |
| 43 | 7003 | 139228 | 11809 | 4851 |
| 44 | 7003 | 139228 | 11809 | 4851 |

As shown in Table 13, during a time from 0 to 10 seconds, the flow rates of the raw gases are changed by the second flow controller group 2 every time four seconds (the first time $T_1$) are elapsed. During a time from 10 to 32 seconds, the flow rates of the raw gases are set to be constant by the second flow controller group 2 because the flow rates of the raw gases need not be changed.

And then, after 32 seconds are elapsed, the flow rates of the raw gases are changed by the second flow controller group 2 every time four seconds (=the first time $T_1$) are elapsed. As shown in Table 11, during a time from 35 to 36 seconds, the simulated gas is supplied from the second flow controller group 2 to the primary supply pipe 101. After 32 seconds determined by subtracting three seconds (=the first time $T_1$ minus the second time $T_2$) from 35 seconds are elapsed, the flow rates of the raw gases are changed by the second flow controller group 2 every time four seconds (=the first time $T_1$) are elapsed. During three seconds from 32 to 35 seconds, the simulated gas is exhausted from the second flow controller group 2 to the outside so that the concentration and flow rate of the simulated gas become stabilized.

TABLE 14 the third flow controller group

| time(second) | $O_2$(ppm) | $CO_2$(ppm) | CO(ppm) | $C_3H_6$(ppm) |
|---|---|---|---|---|
| 1 | 197074 | 9212 | 0 | 1223 |
| 2 | 197074 | 9212 | 0 | 1223 |
| 3 | 197074 | 9212 | 0 | 1223 |
| 4 | 7307 | 134882 | 3796 | 1235 |
| 5 | 7307 | 134882 | 3796 | 1235 |
| 6 | 7307 | 134882 | 3796 | 1235 |
| 7 | 7307 | 134882 | 3796 | 1235 |
| 8 | 5169 | 131441 | 12159 | 1302 |
| 9 | 5169 | 131441 | 12159 | 1302 |
| 10 | 5169 | 131441 | 12159 | 1302 |
| 11 | 5169 | 131441 | 12159 | 1302 |
| 12 | 0 | 0 | 0 | 0 |
| 13 | 0 | 0 | 0 | 0 |
| 14 | 0 | 0 | 0 | 0 |
| 15 | 0 | 0 | 0 | 0 |
| 16 | 0 | 0 | 0 | 0 |
| 17 | 0 | 0 | 0 | 0 |
| 18 | 0 | 0 | 0 | 0 |
| 19 | 0 | 0 | 0 | 0 |
| 20 | 0 | 0 | 0 | 0 |
| 21 | 0 | 0 | 0 | 0 |
| 22 | 0 | 0 | 0 | 0 |
| 23 | 0 | 0 | 0 | 0 |
| 24 | 0 | 0 | 0 | 0 |
| 25 | 0 | 0 | 0 | 0 |
| 26 | 0 | 0 | 0 | 0 |
| 27 | 0 | 0 | 0 | 0 |
| 28 | 0 | 0 | 0 | 0 |
| 29 | 0 | 0 | 0 | 0 |
| 30 | 8510 | 137393 | 12069 | 2675 |
| 31 | 8510 | 137393 | 12069 | 2675 |
| 32 | 8510 | 137393 | 12069 | 2675 |
| 33 | 8510 | 137393 | 12069 | 2675 |
| 34 | 9242 | 137865 | 12720 | 3410 |
| 35 | 9242 | 137865 | 12720 | 3410 |
| 36 | 9242 | 137865 | 12720 | 3410 |
| 37 | 9242 | 137865 | 12720 | 3410 |
| 38 | 6532 | 139296 | 12240 | 5345 |
| 39 | 6532 | 139296 | 12240 | 5345 |
| 40 | 6532 | 139296 | 12240 | 5345 |
| 41 | 6532 | 139296 | 12240 | 5345 |
| 42 | 6459 | 139564 | 11822 | 4837 |
| 43 | 6459 | 139564 | 11822 | 4837 |
| 44 | 6459 | 139564 | 11822 | 4837 |
| 45 | 6459 | 139564 | 11822 | 4837 |

As shown in Table 14, during a time from 0 to 11 seconds, the flow rates of the raw gases are changed by the third flow controller group 3 every time four seconds (the first time $T_1$) are elapsed. During a time from 11 to 29 seconds, the flow rates of the raw gases are set to be zero (or very low) by the third flow controller group 3 because the flow rates of the raw gases need not be changed.

And then, after 29 seconds are elapsed, the flow rates of the raw gases are changed by the third flow controller group 3 every time four seconds (=the first time $T_1$) are elapsed. As shown in Table 11, during a time from 32 to 33 seconds, the simulated gas is supplied from the third flow controller group 3 to the primary supply pipe 101. After 29 seconds determined by subtracting three seconds (=the first time $T_1$ minus the second time $T_2$) from 32 seconds are elapsed, the flow rates of the raw gases are changed by the third flow controller group 3 every time four seconds (=the first time $T_1$) are elapsed. During three seconds from 29 to 32 seconds, the simulated gas is exhausted from the third flow controller group 3 to the outside so that the concentration and flow rate of the simulated gas become stabilized.

TABLE 15

| | the fourth flow controller group | | | |
|---|---|---|---|---|
| time(second) | $O_2$(ppm) | $CO_2$(ppm) | CO(ppm) | $C_3H_6$(ppm) |
| 1 | 48554 | 101597 | 564 | 792 |
| 2 | 48554 | 101597 | 564 | 792 |
| 3 | 48554 | 101597 | 564 | 792 |
| 4 | 48554 | 101597 | 564 | 792 |
| 5 | 6237 | 133647 | 5648 | 1262 |
| 6 | 6237 | 133647 | 5648 | 1262 |
| 7 | 6237 | 133647 | 5648 | 1262 |
| 8 | 6237 | 133647 | 5648 | 1262 |
| 9 | 5490 | 135309 | 14368 | 1192 |
| 10 | 5490 | 135309 | 14368 | 1192 |
| 11 | 5490 | 135309 | 14368 | 1192 |
| 12 | 5490 | 135309 | 14368 | 1192 |
| 13 | 0 | 0 | 0 | 0 |
| 14 | 0 | 0 | 0 | 0 |
| 15 | 0 | 0 | 0 | 0 |
| 16 | 0 | 0 | 0 | 0 |
| 17 | 0 | 0 | 0 | 0 |
| 18 | 0 | 0 | 0 | 0 |
| 19 | 0 | 0 | 0 | 0 |
| 20 | 0 | 0 | 0 | 0 |
| 21 | 0 | 0 | 0 | 0 |
| 22 | 0 | 0 | 0 | 0 |
| 23 | 0 | 0 | 0 | 0 |
| 24 | 0 | 0 | 0 | 0 |
| 25 | 0 | 0 | 0 | 0 |
| 26 | 0 | 0 | 0 | 0 |
| 27 | 0 | 0 | 0 | 0 |
| 28 | 0 | 0 | 0 | 0 |
| 29 | 0 | 0 | 0 | 0 |
| 30 | 0 | 0 | 0 | 0 |
| 31 | 10745 | 138462 | 10260 | 2277 |
| 32 | 10745 | 138462 | 10260 | 2277 |
| 33 | 10745 | 138462 | 10260 | 2277 |
| 34 | 10745 | 138462 | 10260 | 2277 |
| 35 | 12407 | 136616 | 10677 | 4541 |
| 36 | 12407 | 136616 | 10677 | 4541 |
| 37 | 12407 | 136616 | 10677 | 4541 |
| 38 | 12407 | 136616 | 10677 | 4541 |
| 39 | 9234 | 138882 | 10782 | 5161 |
| 40 | 9234 | 138882 | 10782 | 5161 |
| 41 | 9234 | 138882 | 10782 | 5161 |
| 42 | 9234 | 138882 | 10782 | 5161 |
| 43 | 7749 | 139215 | 11415 | 3825 |
| 44 | 7749 | 139215 | 11415 | 3825 |
| 45 | 7749 | 139215 | 11415 | 3825 |
| 46 | 7749 | 139215 | 11415 | 3825 |

As shown in Table 15, during a time from 0 to 12 seconds, the flow rates of the raw gases are changed by the fourth flow controller group 4 every time four seconds (the first time $T_1$) are elapsed. During a time from 12 to 30 seconds, the flow rates of the raw gases are set to be zero (or very low) by the fourth flow controller group 4 because the flow rates of the raw gases need not be changed.

And then, after 30 seconds are elapsed, the flow rates of the raw gases are changed by the fourth flow controller group 4 every time four seconds (=the first time $T_1$) are elapsed. As shown in Table 11, during a time from 33 to 34 seconds, the simulated gas is supplied from the fourth flow controller group 4 to the primary supply pipe 101. After 30 seconds determined by subtracting three seconds (=the first time $T_1$ minus the second time $T_2$) from 33 seconds are elapsed, the flow rates of the raw gases are changed by the fourth flow controller group 4 every time four seconds (=the first time $T_1$) are elapsed. During three seconds from 30 to 33 seconds, the simulated gas is exhausted from the fourth flow controller group 4 to the outside so that the concentration and flow rate of the simulated gas become stabilized.

As described above, in case that the concentration of the simulated gas is not changed during the third time $T_3$ longer than the second time $T_2$, the simulated gas needs not be supplied sequentially from the four flow controller groups 1, 2, 3 and 4 every time the second time $T_2$ is elapsed. Thus, during the third time $T_3$, the simulated gas with a constant concentration can be supplied from any one of the four flow controller groups 1, 2, 3 and 4 to the primary supply pipe 101. During a time determined by subtracting the first time $T_1$ from the third time $T_3$, the simulated gas is not be supplied, or the simulated gas with a very low flow rate is supplied from the remaining flow controller groups. Thereby, it is possible to reduce the consumption of the raw gases.

According to one or more embodiments, the number of the flow controller groups of the flow control system 100 and the switching valves of the switching valve system 200 (the mixing pipes) (in one or more of the above-described embodiments, the number may be four) is determined according to the flow rates of the raw gases, a response speed of the controlling unit, the flow control system and the switching valve system, the number of the raw gas sources, the second time $T_2$ and so on. For example, in case that the flow rates of the raw gases is low, it takes a long time to generate the simulated gas with the predetermined concentration and flow rate because the speeds of the raw gases are low, so that the number should be large. In case that the number of the raw gas sources is large, it takes a long time to generate the simulated gas with the predetermined concentration and flow rate because the length of the mixing pipe and the inner volume of the pipe increase, so that the number lines should be large. Thus, the number of the flow controller groups and the switching valves is not limited to the above-described embodiments.

According to one or more embodiments, the second time $T_2$ needs not be equal for all of the flow controller groups. In one or more embodiments, the first time $T_1$ is determined by summing up the second times $T_2$.

According to one or more embodiments, in case that the flow rates of the raw gases are low, it takes a long time to generate the simulated gas with a predetermined concentration because the speeds of the raw gases are slow, so that it may be advantageous to use the pipe having smaller inner volume as possible so as to increase the speeds of the raw gases. The number of the raw gas sources is not limited to the above-described embodiments.

According to one or more embodiments, a mixing chamber for mixing the raw gases may be used instead of the mixing pipe.

While the invention has been described with respect to a limited number of embodiments, those skilled in the art, having the benefit of this disclosure, will appreciate that other embodiments can be devised which do not depart from the scope of the invention as disclosed herein. Furthermore, those of ordinary skill in the art would appreciate that certain "units" or "devices" of the one or more embodiments may be implemented by a circuit, processor, etc. using known methods. Accordingly, the scope of the invention should be limited only by the attached claims.

DESCRIPTION OF THE REFERENCE CHARACTERS 1 first flow controller group
2 second flow controller group
3 third flow controller group
4 fourth flow controller group
5 raw gas source group
6 first switching valve
7 second switching valve
8 third switching valve
9 fourth switching valve
10 to 14 flow controllers of the first flow controller group
20 to 24 flow controllers of the second flow controller group
30 to 34 flow controllers of the third flow controller group
40 to 44 flow controllers of the fourth flow controller group
50 to 54 raw gas sources
100 flow control system
200 switching valve system
300 controlling unit
500 evaluation device
101 primary supply pipe
102 primary exhaust pipe
$T_1$ first time
$T_2$ second time
$T_3$ third time

The invention claimed is:

1. A simulated gas supply apparatus, comprising:
a raw gas source group comprising a plurality of raw gas sources;
a flow control system comprising a plurality of flow controller groups, each of which comprises a plurality of flow controllers, each of the flow controllers being provided for each of the raw gas sources so as to control flow rates of each of the raw gas sources;
a primary supply pipe for supplying a simulated gas to an evaluation device, the simulated gas being supplied from each of the flow controller groups;
a primary exhaust pipe for exhausting the simulated gas;
a switching valve system comprising a plurality of switching valves, each of which is provided for each of the flow controller groups so as to switch the simulated gas flow between the primary supply pipe and the primary exhaust pipe; and
a controlling unit that controls the flow control system and the switching valve system, wherein
the controlling unit controls the flow control system and the switching valve system in such a way that
each of the flow controller groups changes a flow rate of the simulated gas every time a first time is elapsed, each of the switching valves flows the simulated gas to the primary supply pipe every time the first time is elapsed, and maintains the simulated gas flow to the primary supply pipe during a second time shorter than the first time,
the simulated gas is supplied sequentially from each of the flow controller groups to the primary supply pipe every time the second time is elapsed.

2. The simulated gas supply apparatus according to claim 1, wherein
the second time is an equal for each of the flow controller groups, and
the first time is defined as a value obtained by multiplying the second time by the number of the flow controller groups.

3. The simulated gas supply apparatus according to claim 1, wherein the raw gas source group further comprises:
a first raw gas source for supplying a first raw gas with higher concentration than a predetermined concentration; and
a second raw gas source for supplying a second raw gas with a lower concentration than the predetermined concentration, wherein
the controlling unit controls the raw gas source group in such a way that
the first raw gas is supplied from the first raw gas source when the concentration of a required raw gas is higher than the predetermined concentration, and
the second raw gas is supplied from the second raw gas source when the concentration of the required raw gas is lower than the predetermined concentration.

4. The simulated gas supply apparatus according to claim 1, wherein
when a concentration of the simulated gas supplied to the primary supply pipe is not changed during a third time longer than the second time, and then after the concentration of the simulated gas supplied to the primary supply pipe is changed,
the controlling unit controls the flow control system in such a way that
a simulated gas with a constant flow rate is supplied from one of the flow controller groups during the third time, and
the simulated gas is not supplied, or a simulated gas with a zero flow rate is supplied from the remaining flow controller groups during a time determined by subtracting the first time from the third time.

5. The simulated gas supply apparatus according to claim 2, wherein the raw gas source group further comprises:
the first raw gas source for supplying the first raw gas with higher concentration than the predetermined concentration; and
the second raw gas source for supplying the second raw gas with lower concentration than the predetermined concentration, wherein
the controlling unit controls the raw gas source group in such a way that
the first raw gas is supplied from the first raw gas source when the concentration of the required raw gas is higher than the predetermined concentration, and
the second raw gas is supplied from the second raw gas source when the concentration of the required raw gas is lower than the predetermined concentration.

6. The simulated gas supply apparatus according to claim 2, wherein
when the concentration of the simulated gas supplied to the primary supply pipe is not changed during a third time longer than the second time, and then after the concentration of the simulated gas supplied to the primary supply pipe is changed,
the controlling unit controls the flow control system in such a way that
the simulated gas with a constant flow rate is supplied from one of the flow controller groups during the third time, and
the simulated gas is not supplied, or the simulated gas with a zero flow rate is supplied from the remaining flow controller groups during a time determined by subtracting the first time from the third time.

7. The simulated gas supply apparatus according to claim 3, wherein
when the concentration of the simulated gas supplied to the primary supply pipe is not changed during a third time longer than the second time, and then after the concentration of the simulated gas supplied to the primary supply pipe is changed, the controlling unit controls the flow control system in such a way that the simulated gas with a constant flow rate is supplied from one of the flow controller groups during the third time, and the simulated gas is not supplied, or the simulated gas with a zero flow rate is supplied from the remaining flow controller groups during a time determined by subtracting the first time from the third time.

* * * * *